(12) United States Patent
Lowry et al.

(10) Patent No.: US 8,323,433 B1
(45) Date of Patent: Dec. 4, 2012

(54) METHOD OF MAKING A CORD STYLE FLEXIBLE GOLF GRIP

(75) Inventors: Joe Wayne Lowry, Pinehurst, NC (US); Billy Dee Wood, Whispering Pines, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/218,506

(22) Filed: Aug. 26, 2011

(51) Int. Cl.
*B32B 37/00* (2006.01)
(52) U.S. Cl. ........ 156/149; 156/153; 156/173; 156/175; 473/298; 473/300
(58) Field of Classification Search .................. 473/298, 473/300; 156/148, 149, 171, 169, 173, 175, 156/153

See application file for complete search history.

(56) References Cited

U.S. PATENT DOCUMENTS

| 2,177,143 | A | * | 10/1939 | Lamkin | 473/302 |
| 3,140,873 | A | * | 7/1964 | Goodwin | 473/302 |
| 5,792,551 | A | * | 8/1998 | Miyao | 428/304.4 |
| 6,723,006 | B1 | * | 4/2004 | Lin | 473/300 |

FOREIGN PATENT DOCUMENTS

JP        10-24134 A * 1/1998

\* cited by examiner

*Primary Examiner* — Jeff Aftergut
(74) *Attorney, Agent, or Firm* — Fay Sharpe LLP

(57) ABSTRACT

A method of making a corded surface flexible elastomer golf club grip. An underlist is extruded of seamless tubular uncured elastomer and a pattern of textile cords wound thereon. In one version of the method, an outer seamless tubular extruded uncured elastomer layer is assembled over the cord patterned underlist. A core rod is inserted in the underlist, an uncured elastomer cap assembled on the end and the assemblage cured in a heated compression mold. Upon removal from the mold, some material is removed from the outer surface to expose some of the cord. In another version, the uncured cord wound underlist with core rod is inserted in a mold cavity and a thin outer layer of elastomer injection molded thereover and the assemblage cured in the mold.

12 Claims, 8 Drawing Sheets

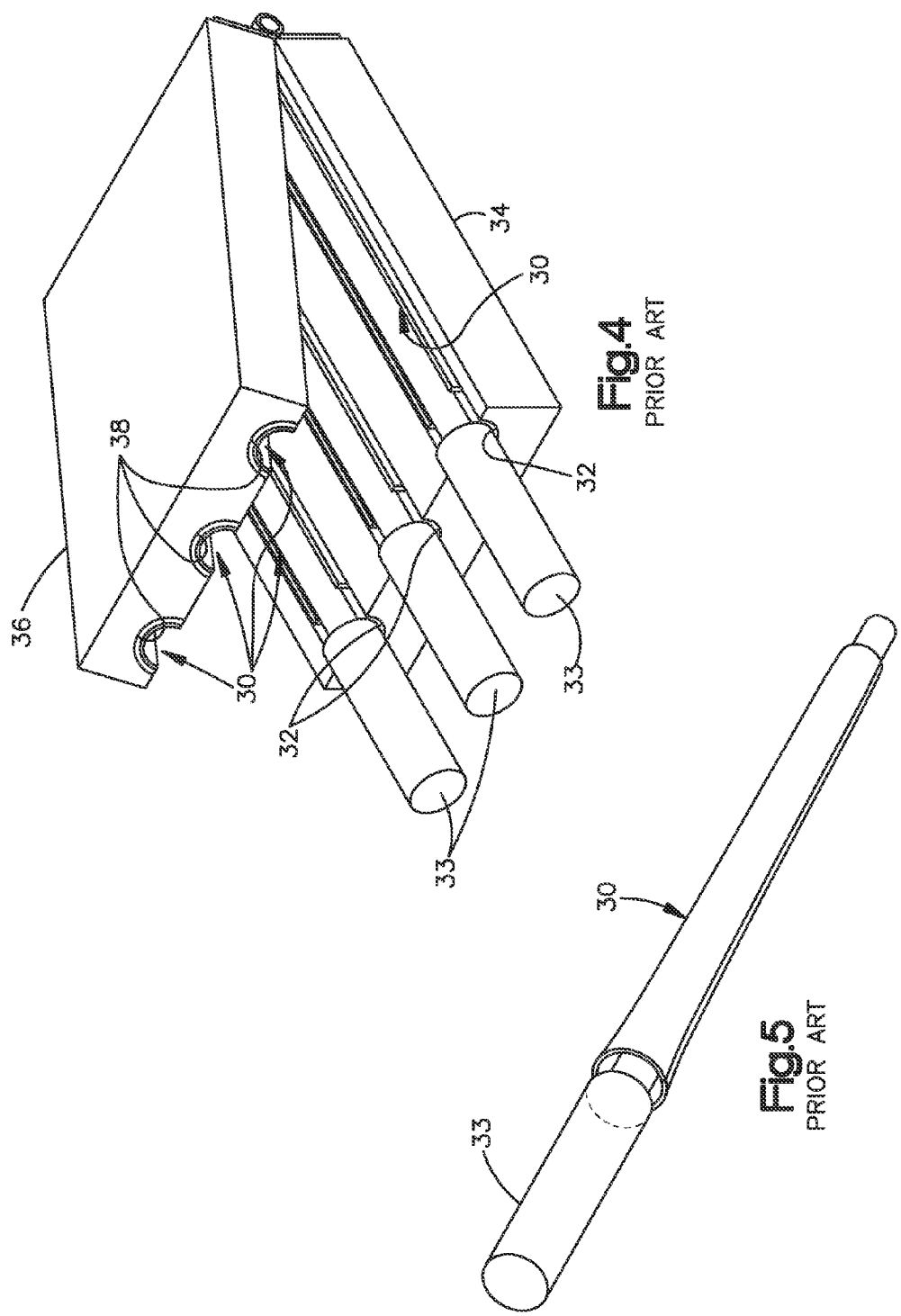

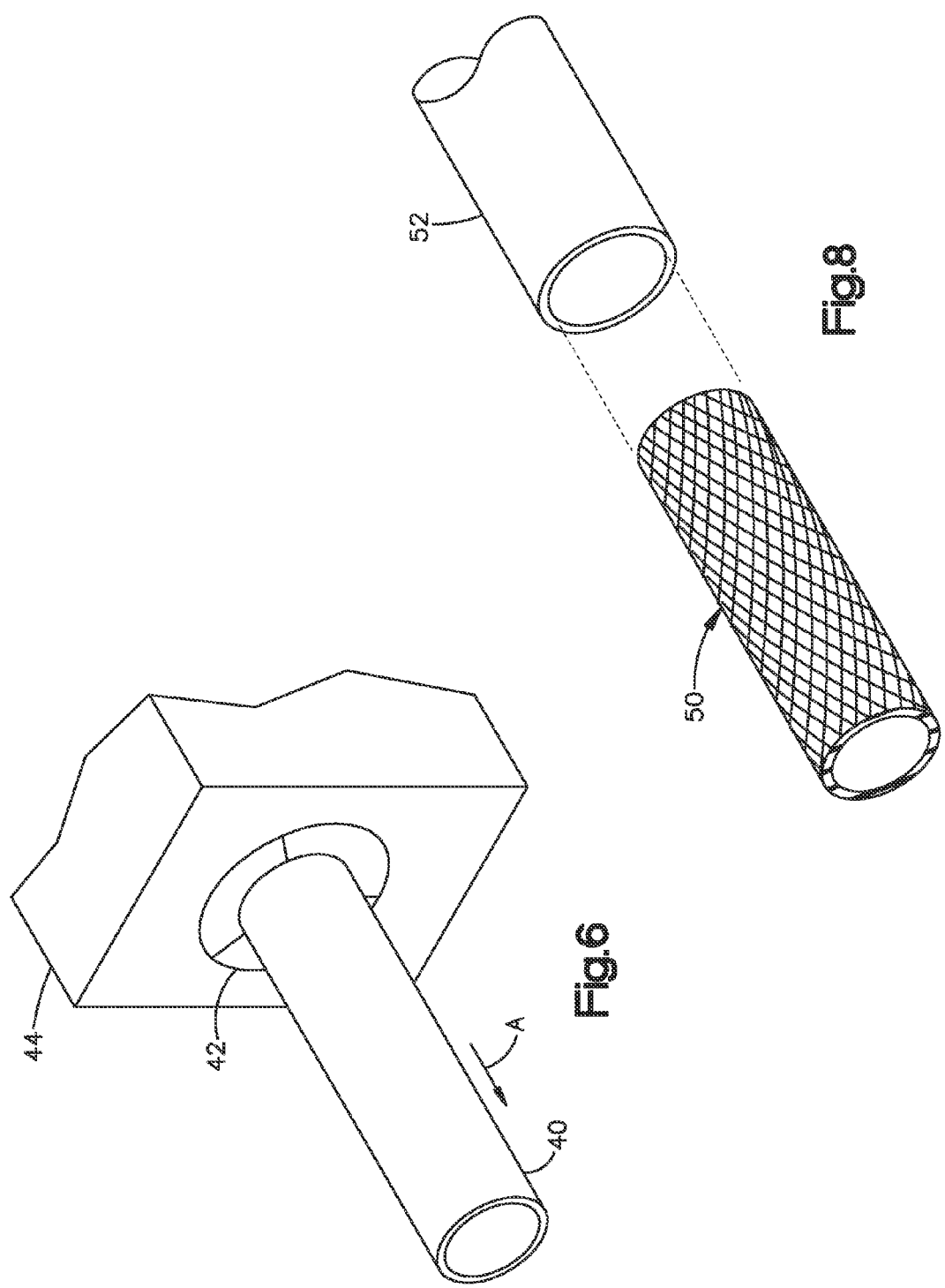

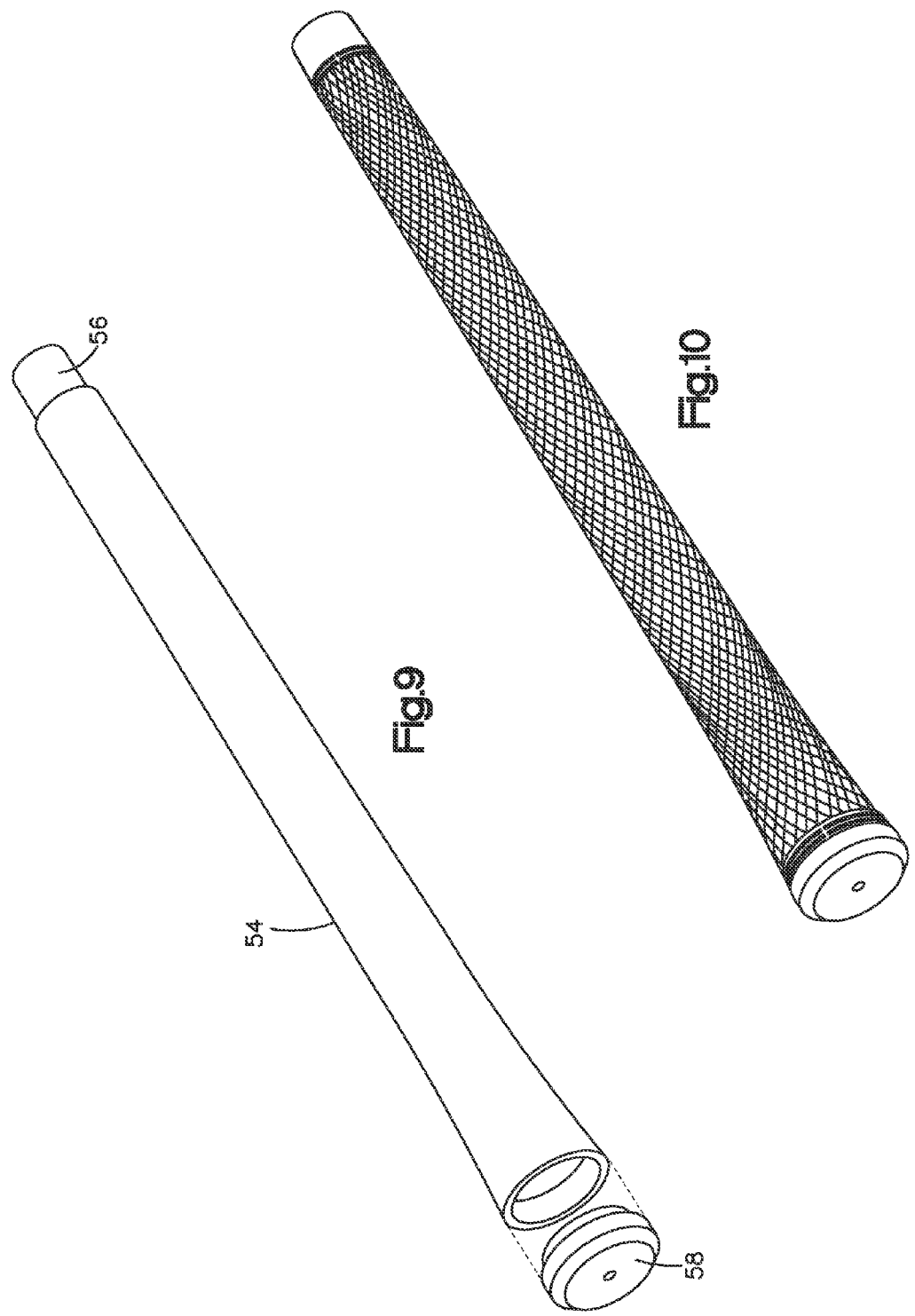

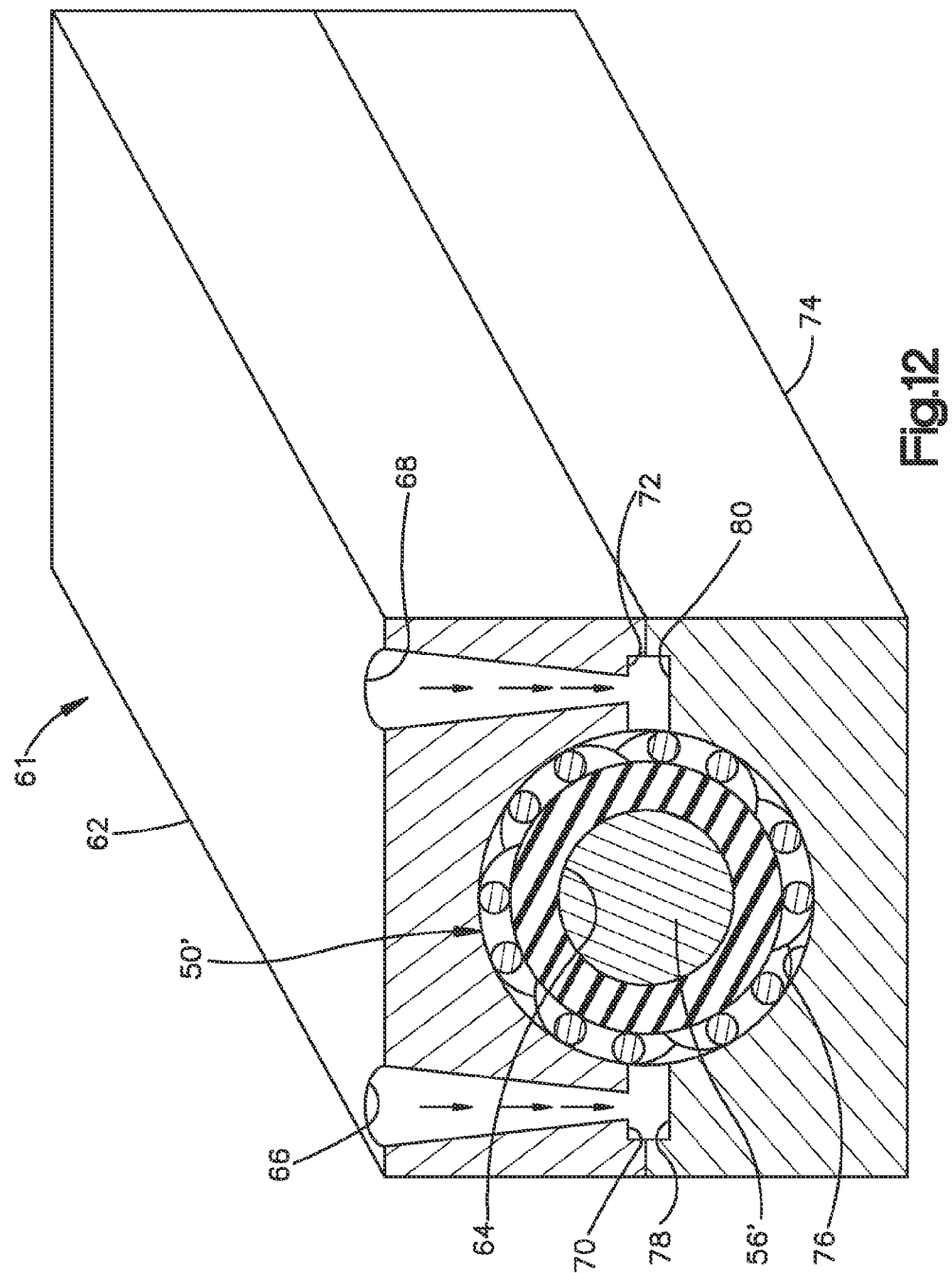

METHOD OF MAKING A CORD STYLE FLEXIBLE GOLF GRIP

BACKGROUND

The present disclosure relates to manufacturing processes for cord style golf grips of the type having exposed cord material embedded in the grip for enhancing gripability. The presence of exposed cords in a flexible rubber golf grip has attained widespread popularity and has enjoyed a growing market. However, the processes for manufacturing such a grip have proven to be somewhat complex and labor intensive thereby increasing the cost of the grips.

Referring to FIG. 1, an example of the current manufacturing process employed for a corded rubber golf club grip is shown wherein an upper and lower rubber sheet 10, 12 are employed which have been previously prepared by calendering uncured rubber to a desired predetermined thickness which may require multiple passes through the calender to achieve the desired dimensional thickness. The sheets 10, 12 are disposed on opposite sides of the desired fabric or corded layer 13 and passed through idler nips indicated generally at 16, 18, 20. The three layers are then fed through a pair of calender rollers 22, 24 which compress and force the sheets together to a common single sheet stock indicated generally at 26 for further processing.

Another alternative technique currently employed is that of laying out the sheets 10, 12 on long tables and coating the surface of the sheets with solvent bonding agent and manually laying the sheets over the fabric or cord layer such that the cords are sandwiched between the sheets. The sheets with the fabric layer in between can then be run through a calender to achieve the desired thickness of the sheet stock. This latter technique is even more time consuming and costly for preparing the sheet stock.

Referring to FIG. 2, the presently known process for manufacturing is continued wherein the sheet stock 26 is passed through a stamping press, indicated generally at 28, which die cuts desired pattern pieces 30 out of the sheet stock 26 which pattern pieces are then removed and have the general form illustrated in FIG. 3. It will be seen that there is a considerable amount of scrap material on the sheet stock after die cutting the pattern pieces 26. In addition, the fabric layer 14 is quite costly due to the fact that the fabric is specially woven for golf grip manufacture and is thus a relatively low volume item for fabric mills. Attempts have been made to offset the cost of the fabric by buying standard fabric manufactured in high volume; however, this necessarily limits the choices for type of cord and the amount of variation in cord pattern that can be employed in the fabric for the corded grip. This results in limited variation in the style of the grip which can be offered for enhancing marketability.

Referring to FIGS. 4 and 5, the existing known manufacturing process is continued by wrapping the pattern pieces 26 individually about core rods 33 and placing the pattern pieces and core rods individually in cylindrical pre-mold cavities 32 formed in a pre-mold section 34 and closing the pre-mold with an upper pre-mold section 36 having remaining cylindrical pre-mold cavities 38 formed therein. In the currently known process, the die cut pattern pieces 30 each comprise one-half the periphery of the molded rubber grip and this requires that one of the pattern pieces 30 be loaded in each molded cavity in both the upper and the lower halves 34, 36 of the mold as shown in FIG. 4. The pre-mold is then heated to effect only partial curing of the grip and the pre-mold is then opened and the partially cured preform grips and core rods removed from the mold. One of the preform grips is shown in FIG. 5 with the pattern pieces 30 wrapped around rod 33.

The preform grip of FIG. 5 and core rod are then manually placed in a heated compression mold cavity along with an end cap which molds the preform into a finished golf grip shape.

Thus, it can be seen from the preceeding description that the present process for manufacturing corded flexible rubber golf club grips is not only time consuming by virtue of requiring multiple manual steps but also yields much scrap material which results in significantly increased cost for manufacturing the grip as compared with, for example, an uncorded golf club grip.

Thus, it has long been desired to provide a way or means of manufacturing a corded flexible rubber golf club grip in a manner which permits wide variation of styles of appearance for the grip and yet is less complex and has a significantly reduced manufacturing cost.

SUMMARY

The present disclosure describes a method of making a corded flexible rubber golf club grip of the type having portions of embedded cords exposed on the outer surface of the grip. In particular, the method eliminates the need for fabricating sheet stock of layers on opposite sides of a layer of cords and die cutting patterns of the sheet stock for wrapping about a core rod and manual placement in pre-mold cavities for pre-curing the rubber to form a grip preform which must be subsequently molded again to form a completed grip.

In the presently disclosed method, an inner layer of rubber or underlist is extruded in seamless tubular form and textile cords are machine wound about the underlist to form a cord pattern; and, the cords may be single cords or braided or twisted cords. The cord wrapping is accomplished by a commercially available braiding machine such as employed for manufacturing cord re-enforced hose. In one version of the present method, the cord wrapped underlist is then assembled inside another extruded outer seamless tubular layer of uncured elastomer; and, a core rod is inserted therein and an uncured elastomer end cap is assembled onto the end of the corded assemblage. The assemblage is then placed in an unshown compression mold and cured to form a finished grip. The cured finished grip is then removed from the unshown compression mold and the outer surface thereof buffed to expose portions of the cord to provide the desired corded flexible grip surface for the golf club.

In another version of the present method, the cord wrapped underlist may be coated with a thin overmold layer injected over the outer face by inserting a core rod and placing the assemblage in a molding press and injecting elastomer to form the overmold layer.

The method of the present invention allows multiple different types, materials and sizes of cord to be wrapped on the underlist and various different type of cord wound patterns to be employed in addition to permitting some or all of the cords to be colored to provide various design effects to enhance marketability.

BRIEF DESCRIPTION OF THE DRAWINGS

FIG. 4 is a perspective view of the prior art grip patterns as loaded into a pre-mold prior to closing the pre-mold for partial curing;

FIG. 5 is a perspective view of the prior art pre-molded grip after removal from the pre-mold of FIG. 4;

FIG. 6 is a perspective view of the underlist being extruded as a seamless tube in the disclosed method;

FIG. 8 is a perspective view of the corded underlist of FIG. 7 being assembled into a seamless extruded tubular outer layer in accordance with the present disclosure;

FIG. 9 is a perspective view of the assembled uncured grip with a core rod and illustrating the assembly of the cap thereon prior to curing in a mold;

FIG. 10 is a side view of a molded and cured grip after removal of material on the outer surface to expose portions of the cord;

DETAILED DESCRIPTION

Figure 1:
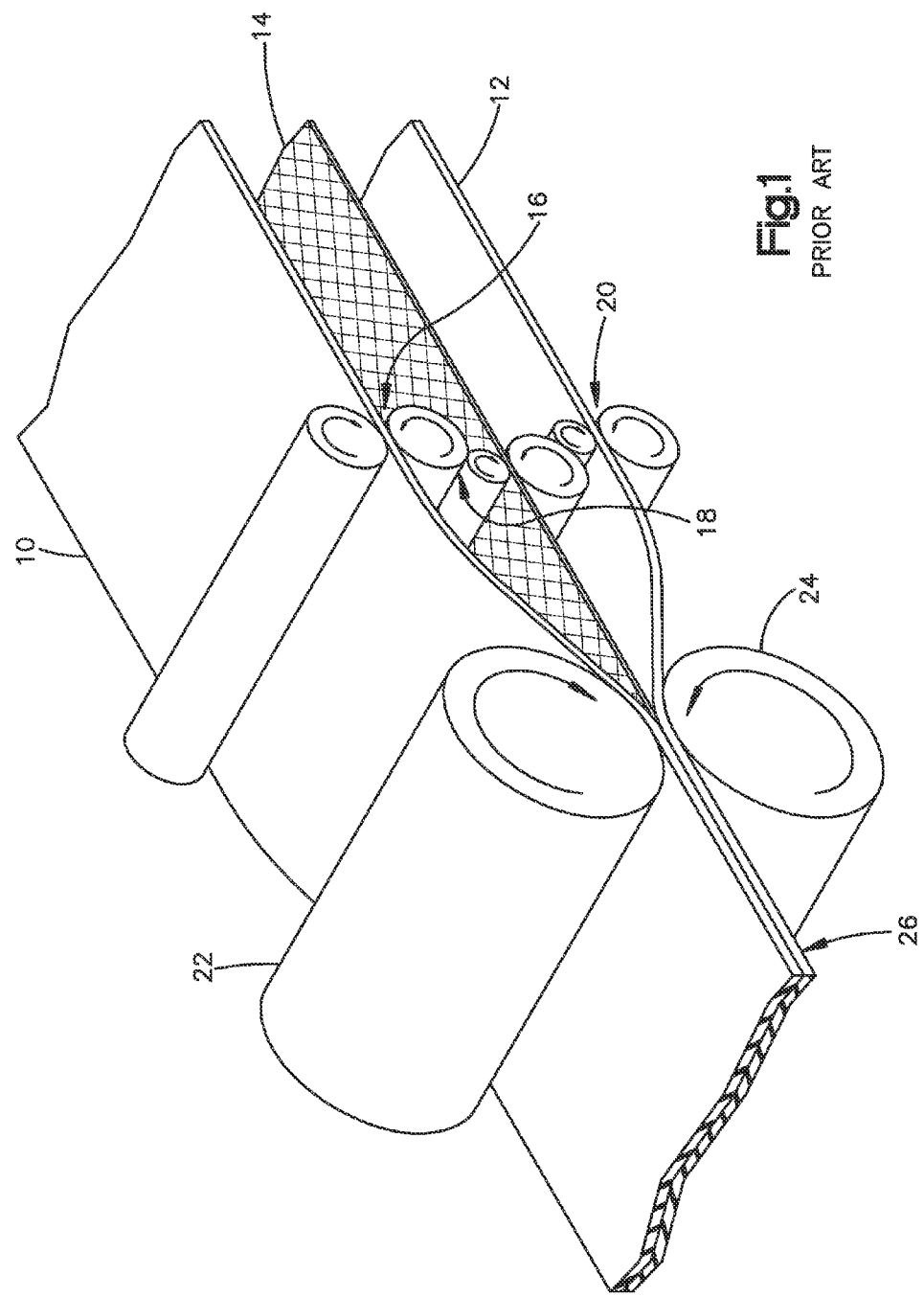
FIG. 1 is a perspective view of prior art apparatus for calendering cord reinforced sheet stock.
Figure 2:
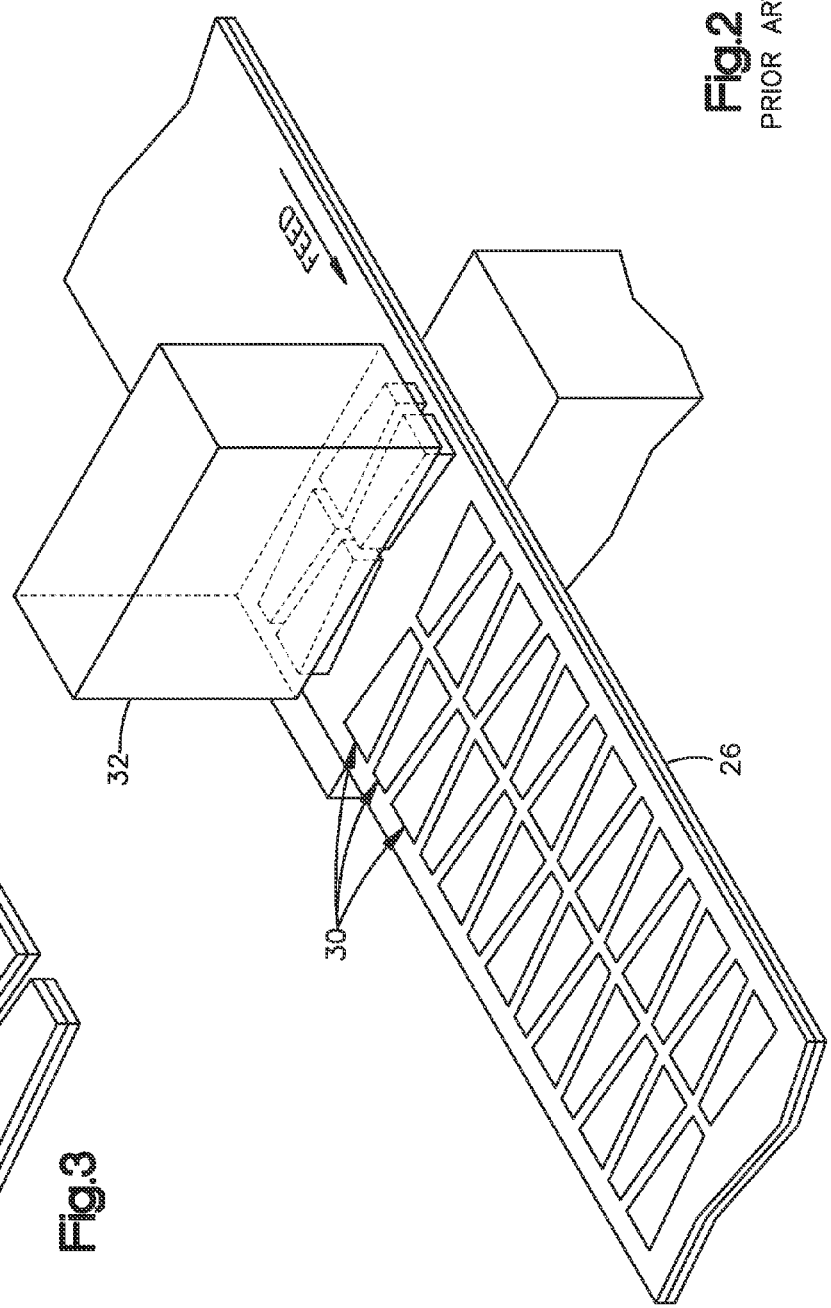
FIG. 2 is a perspective view of the prior art apparatus for die cutting rip patterns from the sheet stock of FIG. 1.
Figure 3:
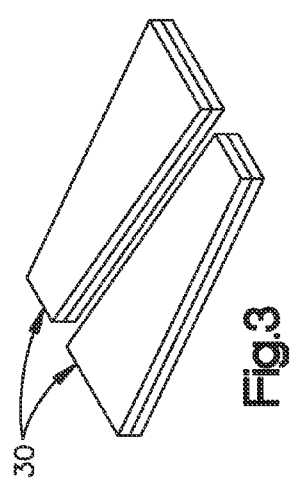
FIG. 3 is a perspective view of the die cut pattern pieces from the operations of FIG. 2.

Referring to FIG. 6, in the presently disclosed method, an underlist indicated generally at 40 is formed in seamless tubular configuration by extruding from a die 42 employed in a commercially available rubber extruding machine 44 to form the underlist 40 to the desired diameter and wall thickness. The movement of the underlist 40 is indicated by the black arrow designated by the reference character "A" in FIGS. 6 and 7.

Figure 7:
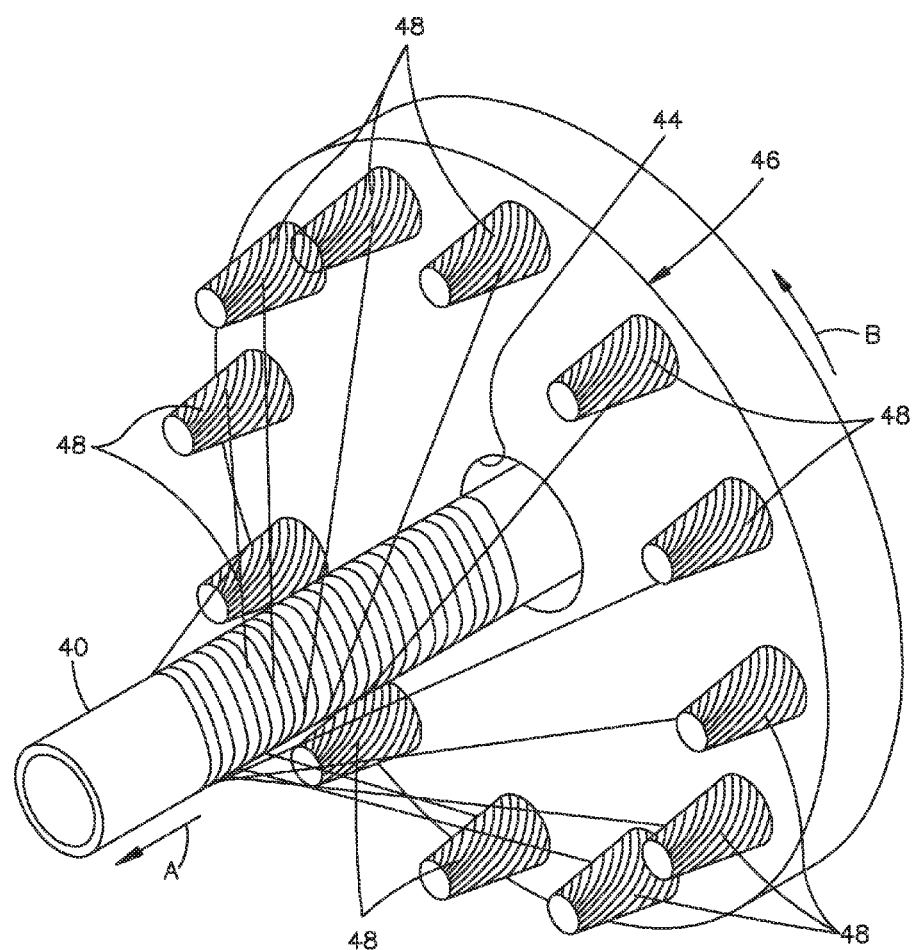
FIG. 7 is a perspective view of the machine winding of cord over the extruded underlist of FIG. 6.

Referring to FIG. 7, the tubular uncured underlist 40, as it exits the die 42, may be then fed through a central orifice 44 of a commercially available orbital winding machine indicated generally at 46. The winding machine 46 typically has a plurality of circumferentially radially outwardly spaced spools 48 of textile cord which are orbited about the underlist 40 by the machine. Cords from the spools 48 are spirally wrapped about the underlist 40 by rotation of the machine 46 in the direction indicated by the black arrow denoted "B" in FIG. 7 as the underlist 40 is fed axially through the machine in the direction indicated by the arrow A in FIG. 7.

The method of the present disclosure thus permits the cord spools to be arranged to have various desired types and thicknesses of cord and choice of different materials for the textile cord such as synthetic or natural material to provide a variety of cording in the completed golf club grip. This provides for heretofore unobtainable product differentiation and variety for enhancing marketability.

Referring to FIG. 8, the wrapped cord-patterned underlist 40 is indicated generally at 50 as cut into a desired length for the grip. The cord patterned underlist 50 is then assembled into an outer layer 52 of uncured elastomer in tubular form, which may also be conveniently formed by extrusion in the manner similar to that for the underlist shown in FIG. 6. The assembly of the outer tubular layer 52 and the corded underlist assembly 50 is illustrated in FIG. 9 and denoted by reference numeral 54. The assembly 54 has been assembled over a mandrel or core rod 56 and an end cap 58 of uncured elastomer assembled onto the larger diameter open end of the grip 54. In the present practice, the elastomer employed for the cap 58 may be of the type which has a significantly higher durometer when cured than the elastomer employed for the outer layer 52 of the grip. The assembled grip 54 is then placed in a compression mold cavity (not shown) and cured to form the final configuration of the grip. Upon removal of the cured grip from the unshown compression mold, the desired amount of material is removed from the outer layer, as for example, by buffing and in one version gives a grip having the appearance shown in FIG. 10 and denoted by reference numeral 60.

Figure 11:
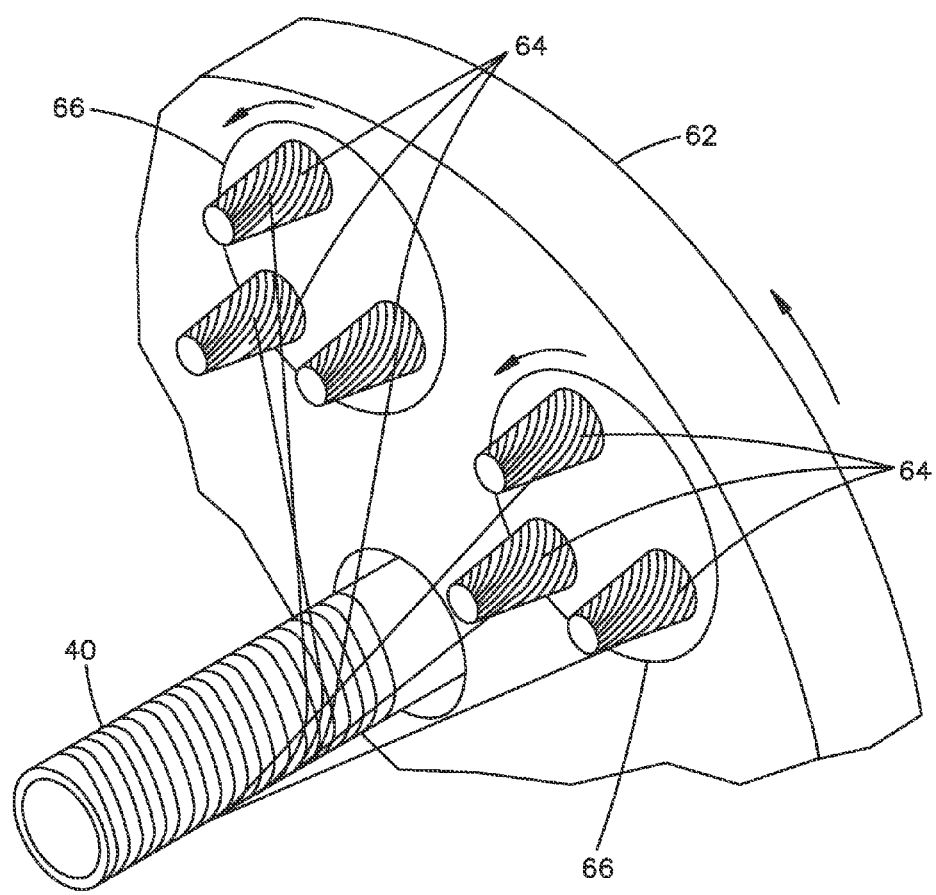
FIG. 11 is a view of an alternate method of winding cord on the underlist according to the present disclosure; and, FIG. 12 is a sectioned perspective view of a corded flexible grip molded according to another version of the method of the present disclosure.

Referring to FIG. 11, an alternate arrangement of the winding machine is indicated generally at 62 and has a plurality of spools 64 disposed at each spool station which spools are orbited about an axis parallel to the axis of the underlist 40 and displaced radially therefrom on a circular plate 66 mounted for rotating about its center so as to provide a twisted arrangement of each cord wound on the underlist 40. Other versions of winding machine may also be employed as, for example, plural spool arrangements whereby the spools are moved to cause each of the cords to have a braided arrangement. Such machines are commercially available and well known in the art of hose making.

Referring to FIG. 12, another version of the method of the present disclosure is illustrated wherein the cord wrapped underlist indicated generally at 50' has a core rod 56' inserted therein and the assemblage thereof is inserted in an injection mold. The mold indicated generally at 61 may comprise an upper section 62 having a cavity 64 formed therein with sprues 66, 68 communicating with the cavity 64 via cross-passages, respectively, 70, 72. The mold includes a lower section 74 which has a cavity 76 formed therein corresponding to cavity 64; and, the cavity 76 communicates with cross-passages 78, 80 which also communicate with the sprues or risers 66, 68. In the version of the method illustrated in FIG. 12, upon assembly of the corded underlist 50' into the mold cavities 64, 76, uncured elastomer is injected through the sprues or risers 66, 68 and flows into the cavities 64, 76 to encase the corded underlist 50' with a relatively thin outer layer of elastomer. The complete grip is then cured with heat in the mold section 62, 74. The cured grip is then removed from the mold cavities and the outer surface buffed to expose some of the cord on the outer surface to provide a finished grip as shown in FIG. 10.

The present disclosure thus describes a method of making a corded flexible rubber golf club grip having portions of the embedded cord exposed on the surface of the grip. In the disclosed method, an underlist is formed as an extruded seamless tubular form of uncured elastomer and textile cord is wound on the surface of the underlist, which may be accomplished by a commercially available winding machine. In one version, the corded underlist is then covered with an extruded tubular outer layer formed of uncured elastomer. The assemblage is then cut to the desired length, assembled onto a core rod and an end cap of uncured elastomer assembled thereon and cured in a compression mold to form the desired final grip configuration. After removal from the mold, the cured grip then has material removed from the outer surface, such as by buffing, to expose a desired amount of the cords to give the cord enhanced feel of the grip. In another version of the method, the corded underlist assemblage with a core rod is placed in a mold and an outer layer of elastomer is injection molded over the corded underlist. The method of the present disclosure thus enables a wide variation of cord patterns to be wound on the underlist and permits wide variation of types of cord in thickness and arrangement such as braiding and enables the use of colored cords as desired to provide unique surface effects of the cord pattern when exposed. The method of the present disclosure eliminates the need of fabricating sheet stock and die cutting patterns for wrapping the patterns on a core rod and pre-molding prior to final curing of the assembled grip.

The exemplary embodiment has been described with reference to the drawings. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of making a flexible golf club grip comprising:
   (a) forming a seamless tubular underlist of curable elastomer;
   (b) winding a pattern of cord over the outer surface of the tubular underlist;
   (c) disposing a closure of elastomeric material in an end of the tubular underlist and forming a grip preform;
   (d) disposing elastomeric material over the preform and molding the grip to a desired shape and curing the elastomeric material; and,
   (e) removing portions of the cured elastomeric material from the outer surface of the grip and exposing portions of the cord pattern.

2. The method defined in claim 1, wherein the winding includes one of (i) braiding and (ii) weaving.

3. The method defined in claim 1, wherein the removing portions of the cured elastomer from the outer surface includes buffing.

4. The method defined in claim 1, further comprising at least partially curing the underlist before winding.

5. The method defined in claim 1, wherein the disposing a closure includes disposing a closure formed of one of (i) partially cured elastomer and (ii) cured elastomer.

6. The method defined in claim 1, wherein the applying a layer of uncured elastomer over the underlist cord pattern includes extruding a tube of uncured elastomer and assembling the tube over the cord pattern.

7. The method defined in claim 1, wherein the applying a layer of uncured elastomer includes applying a layer of uncured elastomer having a cured durometer less than the durometer of the cured underlist.

8. The method defined in claim 1, wherein the disposing a closure includes disposing a closure of elastomeric material having a cured durometer significantly greater than the durometer of the cured underlist.

9. The method defined in claim 1, wherein the winding includes winding a pattern of one of (i) natural and (ii) synthetic textile cord.

10. The method defined in claim 1, wherein the winding includes winding a pattern of one of cords of different (i) diameter, (ii) color, (iii) weave styles, and (iv) weave densities.

11. The method defined in claim 1, wherein disposing elastomeric material over the preform includes injection molding.

12. The method of claim 1, wherein forming a seamless tubular underlist includes extruding uncured elastomer.

* * * * *